Figure 1:
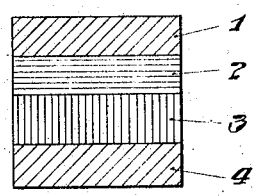

INVENTOR.
OSAMU SABURI 3,299,332
SEMICONDUCTIVE CAPACITOR AND THE METHOD OF MANUFACTURING THE SAME
Osamu Saburi, Nagaoka-cho, Otokuni-gun, Kyoto-fu, Japan, assignor to Murata Manufacturing Co., Ltd., Nagaoka-cho, Otokuni-gun, Kyoto-fu, Japan, a corporation of Japan
Filed July 10, 1961, Ser. No. 123,055
25 Claims. (Cl. 317—237)

This invention relates to capacitors which consist of semiconductive barrier layers which are formed at the junction between metallic oxides that have been made semiconductive by the methods of controlling valence and semiconductive materials that are formed on the surfaces of the metallic oxides.

It is known that oxides of metals which have a valence of more than two can be made semiconductive by introducing suitable foreign atoms in a proper amount. This method of producing semiconductive materials which is called "controlling valence" will be explained hereinafter with examples of titanium oxide and barium titanate. They have titanium ions as the metallic element with a valence more than two.

Titanium oxide and barium titanate happen to have available electrons and become semiconductive, when suitable foreign atoms are introduced. The process is expressed by the following formula.

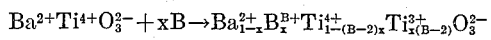
$$Ba^{2+}Ti^{4+}O_3^{2-} + xB \rightarrow Ba_{1-x}^{2+}B_x^{b+}Ti_{1-(B-2)x}^{4+}Ti_{x(B-2)}^{3+}O_3^{2-}$$

where B denotes the atom whose ionic radius is close to that of the barium ion and whose valence is $b$ ($b$ is more than two), and the mole percent of the introduced foreign atom, based on barium, is denoted by $x$.

By the mechanism mentioned above, alkaline earth metal titanates such as barium titanate, calcium titanate, magnesium titanate, strontium titanate, and lead titanate can be made semiconductive. These titanates which have ions of the metals tin or zirconium partially substituted for their titanium ions, and solid solutions which consist of more than two of the above titanates and the above complex compounds can also be made semiconductive by a similar method.

In the former formula, the atom B represents one member of the group consisting of lanthanum, cerium, praseodymium, neodymium, samarium, bismuth, actinium, and thorium, and mixtures thereof. The effective quantity $x$ of the introduced foreign atom ranges between 0.01 and 0.5 mole percent based on barium or other earth metal.

The semiconductive materials mentioned above are produced by the method of fabricating ceramics; the green body with minor additives is mixed thoroughly, dried, calcined, pressed or extruded, fired, for example in air, at 1300° C.~1500° C., and forms semiconductive bodies.

The semiconductive materials obtained by this method are inherently n-type, and may have a p-n junction at the surface, when some semiconductor of the p-type is formed thereon.

The p-type semiconductor may be selected from manganese oxide, cuprous oxide, cupric oxide, p-type silicon or p-type germanium. They are formed by one of the following methods, that is, vacuum evaporation, electric plating, chemical flushing, oxidizing metallic elements formed on the surface of the controlled valency type semiconductor, or wetting the said semiconductor with suitable solution.

This invention contemplates capacitors utilizing the capacity of the barrier layer formed at the said junction.

The basic capacitor structure of this invention is shown in FIGURE 1, the capacitor consisting of the junction between the semiconductor 3 of controlled valency type material and the attached semiconductor 2 of p-type material. Metallic electrodes 1 and 4 are ohmically contacted to p-type semiconductor and controlled valency semiconductor, respectively.

The phenomenon of rectification is generally observed at the junction, and when the voltage is applied in the reverse direction, a space charge layer exists at the junction. Those phenomena are to be understood as indicating the existences of barrier resistance and barrier capacitance.

Even with such a basic construction as shown in FIGURE 1, the barrier capacitance is utilizable; however, a certain biasing voltage should be provided to prevent the rectification.

Figure 2:
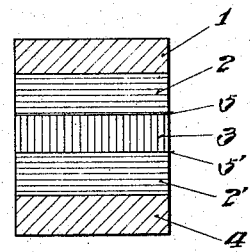

As shown in FIGURE 2, should two films 2 and 2' of p-type semiconductor be formed on both surfaces of controlled valency type semiconductor 3, to present oppositely connected p-n junctions 5 and 5', no biasing voltage is required when the semiconductor is used as a capacitor.

When a reverse voltage is applied to the junction 5 in FIGURE 2, and the said junction is working as a capacitor, the other junction 5' is short-circuited and does not interfere with the capacitive action of junction 5'. In case the polarity of the applied voltage is reversed, the junction 5 similarly acts as a capacitor. Thus, a capacitor whose equivalent circuit is expressed by a parallelly connected barrier resistance and barrier capacitance of one junction, is obtainable with the structure shown in FIGURE 2.

In a practical method of preparing the invented capacitor, semiconductive ceramics are made by introducing lanthanum, cerium, tantalum or other elements B, as enumerated hereinbefore, to barium titanate or to a member of the family of barium titanate. A set of films of manganese oxide, cuprous oxide or other p type semiconductor materials is applied on both surfaces of the said controlled valency ceramics by the method of vacuum evaporation, electric plating, chemical flashing or wetting.

The electrodes are applied on the outer surfaces of p-type materials by such methods as firing, spraying, sputtering or electric plating of silver, gold, platinum, solder indium-gallium metal or indium-amalgam.

The following example of the method of manufacturing capacitors gives entirely satisfactory results.

Barium-strontium-titanate containing strontium in an amount of 5 mole percent and doped with cerium of 0.1 mole percent is used as the material of the base body. Metallic copper films are put on both surfaces of the body by the method of vacuum evaporation or chemical flashing. Then, silver electrodes are fired on the copper films.

This method provides capacitors having a capacity of about 0.4 microfarad/cm.$^2$ and a conductance less than $10^{-6}$ mho/cm.$^2$.

I claim:
1. A capacitor, comprising a body of metallic oxide semi-conductor of the n-type having a composition represented by

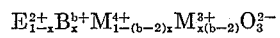
$$E_{1-x}^{2+}B_x^{b+}M_{1-(b-2)x}^{4+}M_{x(b-2)}^{3+}O_3^{2-}$$

where E is an alkaline earth element taken from the group consisting of barium, strontium, calcium, magnesium and lead, and mixtures thereof, M is a metal taken from the group consisting of titanium, tin, zirconium and mixtures thereof, and O is oxygen, where B is a material having a valence $b$ greater than 2 and the atoms of which have an ionic radius close to that of the alkaline earth E, and is taken from the group consisting of lanthanum, cerium, praseodymium, meodymium, samarium, bismuth, actinium and thorium, and the material B being present in an amount of $x$ mole percent of element E and $x$ lies between 0.01 and 0.5, and a semiconductor of the p-type on the opposite faces of said plate of metallic oxide semi-conductor and a barrier layer at the junctions between the semi-conductors.

2. A capacitor as claimed in claim 1 in which E is barium and M is titanium.

3. A capacitor as claimed in claim 1 in which E is a mixture of barium and strontium, and M is titanium.

4. A capacitor as claimed in claim 1 in which E is barium.

5. A capacitor as claimed in claim 1 in which E is strontium.

6. A capacitor as claimed in claim 1 in which E is magnesium.

7. A capacitor as claimed in claim 1 in which E is lead.

8. A capacitor as claimed in claim 1 in which E is a mixture of barium and strontium.

9. A capacitor as claimed in claim 1 in which E is a mixture of strontium and magnesium.

10. A capacitor as claimed in claim 1 in which E is a mixture of barium and magnesium.

11. A capacitor as claimed in claim 1 in which E is a mixture of barium and lead.

12. A capacitor as claimed in claim 1 in which E is a mixture of strontium and lead.

13. A capacitor as claimed in claim 1 in which E is a mixture of magnesium and lead.

14. A capacitor as claimed in claim 1 in which E is a mixture of barium, strontium and magnesium.

15. A capacitor as claimed in claim 1 in which E is a mixture of barium, strontium and lead.

16. A capacitor as claimed in claim 1 in which E is a mixture of strontium, magnesium and lead.

17. A capacitor as claimed in claim 1 in which M is titanium.

18. A capacitor as claimed in claim 1 in which M is tin.

19. A capacitor as claimed in claim 1 in which M is zirconium.

20. A capacitor as claimed in claim 1 in which M is a mixture of titanium and tin.

21. A capacitor as claimed in claim 1 in which M is a mixture of titanium and zirconium.

22. A capacitor as claimed in claim 1 in which M is a mixture of tin and zirconium.

23. A capacitor as claimed in claim 1 in which M is a mixture of titanium, tin and zirconium.

24. A method of making a capacitor, comprising mixing only a material B with a metallic oxide material represented by the formula $$EMO_3$$

where E is an alkaline earth element taken from the group consisting of barium, strontium, calcium, magnesium and lead, and mixtures thereof, M is a metal taken from the group consisting of titanium, tin and zirconium and mixtures thereof, O is oxygen and B is a material having a valence $b$ greater than 2 and the atoms of which have an ionic radius close to that of the alkaline earth E, the material B being mixed in an amount of from 0.01 to 0.5 mole percent of the element E and is taken from the group consisting of lanthanum, cerium, praseodymium, neodymium, samarium, bismuth, actinium and thorium, drying and calcining the mixture, forming it into a plate to be used in the capacitor, firing the formed mixture in an oxygen containing atmosphere for carrying out the reaction $$E^{2+}M^{4+}O_3^{2-} + XB \rightarrow E^{2+}_{1-x}B^{b+}_{x}M^{4+}_{1-(b-2)x}M^{3+}_{x(b-2)}O_3^{2-}$$

to form an n-type metallic oxide semiconductor, where $x$ is the mole percent of the material B which lies between 0.01 and 0.5, and thereafter forming a semiconductor of the p-type on the opposite faces of the plate of n-type semiconductor.

25. A capacitor, comprising a plate of n-type metallic oxide semiconductor formed by the method comprising mixing only a material B with a metallic oxide material represented by the formula $$EMO_3$$

where E is an alkaline earth element taken from the group consisting of barium, strontium, calcium, magnesium and lead, and mixtures thereof, M is a metal taken from the group consisting of titanium, tin and zirconium and mixtures thereof, O is oxygen, and B is a material having a valence $b$ greater than 2 and the atoms of which have an ionic radius close to that of the alkaline earth E, the material B being mixed in an amount of from 0.01 to 0.5 mole percent of the element E and is taken from the group consisting of lanthanum, cerium, praseodymium, neodymium, samarium, bismuth, actinium and thorium, drying and calcining the mixture, forming it into a plate to be used in the capacitor, firing the formed mixture in an oxygen containing atmosphere for carrying out the reaction $$E^{2+}M^{4+}O_3^{2-} + XB \rightarrow E^{2+}_{1-x}B^{b+}_{x}M^{4+}_{1-(b-2)x}M^{3+}_{x(b-2)}O_3^{2-}$$

to form an n-type metallic oxide semiconductor, where $x$ is the mole percent of the material B which lies between 0.01 and 0.5, and a semiconductor of the p-type on the opposite faces of the plate of metallic oxide semiconductor and a barrier layer at the junctions between the semiconductors.

References Cited by the Examiner
UNITED STATES PATENTS

| | | | |
|---|---|---|---|
| 2,841,508 | 7/1958 | Roup et al. | 317—237 X |
| 2,851,405 | 9/1958 | Dymon et al. | 317—237 X |
| 3,037,180 | 5/1962 | Linz | 317—237 |

FOREIGN PATENTS

| | | |
|---|---|---|
| 714,965 | 9/1954 | Great Britain. |

JAMES D. KALLAM, *Primary Examiner.*

GEORGE WESTBY, *Examiner.*

A. S. KATZ, *Assistant Examiner.*